(12) United States Patent
Auray et al.

(10) Patent No.: US 8,162,693 B2
(45) Date of Patent: Apr. 24, 2012

(54) SNAP-IN ELECTRICAL CONNECTOR WITH LOCKING CAM AND METHOD OF USE

(75) Inventors: Delbert L. Auray, Stratford, CT (US); Kenneth M. Kiely, Stratford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 470 days.

(21) Appl. No.: 12/434,780

(22) Filed: May 4, 2009

(65) Prior Publication Data

US 2010/0279530 A1    Nov. 4, 2010

(51) Int. Cl.
| H02G 3/18 | (2006.01) |
|---|---|
| H02B 1/01 | (2006.01) |
| H01R 13/44 | (2006.01) |
| H01R 4/26 | (2006.01) |

(52) U.S. Cl. ........ 439/557; 439/552; 439/142; 439/448; 174/657; 174/658; 174/661; 174/663; 174/665

(58) Field of Classification Search .................. 174/668, 174/669, 657–665; 439/157, 313, 312, 552, 439/142, 557, 448; H01R 13/44, 4/26; H02G 3/18; H02B 1/01
See application file for complete search history.

(56) References Cited

U.S. PATENT DOCUMENTS

| 5,082,454 A * | 1/1992 | Tonkiss et al. ................. 439/320 |
| 5,171,164 A | 12/1992 | O'Neil et al. |
| 5,189,258 A | 2/1993 | Pratesi |
| 5,266,050 A | 11/1993 | O'Neil et al. |
| 5,373,106 A | 12/1994 | O'Neil et al. |
| 5,539,152 A | 7/1996 | Gretz |
| 5,590,228 A * | 12/1996 | Gibola et al. .................. 385/56 |
| 5,775,739 A | 7/1998 | Gretz |
| 6,043,432 A | 3/2000 | Gretz |
| 6,080,933 A * | 6/2000 | Gretz ............................ 174/668 |
| 6,114,630 A | 9/2000 | Gretz |
| 6,114,631 A | 9/2000 | Gretz |
| 6,143,982 A | 11/2000 | Gretz |
| 6,177,633 B1 | 1/2001 | Gretz |
| 6,194,661 B1 | 2/2001 | Gretz |
| 6,310,290 B1 | 10/2001 | Gretz |
| 6,335,488 B1 | 1/2002 | Gretz |
| 6,352,439 B1 | 3/2002 | Stark et al. |
| 6,355,884 B1 | 3/2002 | Gretz |
| 6,444,907 B1 | 9/2002 | Kiely |
| 6,521,831 B1 | 2/2003 | Gretz |
| 6,538,201 B1 | 3/2003 | Gretz |
| 6,596,939 B1 | 7/2003 | Gretz |
| 6,604,400 B1 | 8/2003 | Gretz |
| 6,642,451 B1 | 11/2003 | Gretz |
| 6,670,553 B1 | 12/2003 | Gretz |
| 6,682,355 B1 | 1/2004 | Gretz |
| 6,709,280 B1 | 3/2004 | Gretz |
| 6,780,029 B1 | 8/2004 | Gretz |
| 6,827,604 B1 * | 12/2004 | White ........................... 439/557 |

(Continued)

*Primary Examiner* — Quyen Leung
*Assistant Examiner* — Terrance Kenerly
(74) *Attorney, Agent, or Firm* — Briggs and Morgan P.A.

(57) ABSTRACT

A connector assembly including a connector body with a locking cam defined on an external surface. In a method of use the locking cam cooperates with a perimeter of a knock-out hole into which the connector is to be inserted. During insertion of the connector body the locking cam engages the knock-out hole and deforms a retainer ring so as to permit further insertion. Once the connector body is fully seated, the locking cam cooperates with a locking tang on the retainer ring to hold the connector assembly together.

21 Claims, 9 Drawing Sheets

U.S. PATENT DOCUMENTS

| | | |
|---|---|---|
| 6,849,803 B1 | 2/2005 | Gretz |
| 6,860,758 B1 | 3/2005 | Kiely |
| 6,916,988 B1 | 7/2005 | Auray et al. |
| 6,935,890 B1 | 8/2005 | Gretz |
| 7,057,107 B2 | 6/2006 | Auray et al. |
| 7,060,900 B1 | 6/2006 | Gretz |
| 7,064,272 B2 * | 6/2006 | Auray et al. .................. 174/659 |
| 7,075,007 B2 * | 7/2006 | Auray et al. .................. 174/668 |
| 7,154,042 B2 * | 12/2006 | Auray et al. ................. 174/70 R |
| 7,154,054 B1 | 12/2006 | Gretz |
| 7,161,095 B1 | 1/2007 | Gretz |
| 7,205,489 B2 * | 4/2007 | Auray et al. .................. 174/666 |
| 7,214,890 B2 * | 5/2007 | Kiely et al. .................. 174/666 |
| 7,226,309 B1 | 6/2007 | Gretz |
| 7,238,894 B1 | 7/2007 | Gretz |
| 7,304,251 B1 | 12/2007 | Gretz |
| 7,307,212 B1 | 12/2007 | Gretz |
| 7,329,144 B1 | 2/2008 | Gretz |
| 7,381,088 B1 | 6/2008 | Gretz |
| 7,390,980 B1 | 6/2008 | Gretz |
| 7,442,079 B1 | 10/2008 | Gretz |
| 7,485,806 B1 | 2/2009 | Gretz |
| 7,495,184 B1 | 2/2009 | Gretz |
| 2004/0038596 A1 * | 2/2004 | Bartholoma et al. ......... 439/752 |
| 2007/0045004 A1 * | 3/2007 | Kiely et al. ................... 174/666 |

* cited by examiner

SNAP-IN ELECTRICAL CONNECTOR WITH LOCKING CAM AND METHOD OF USE

TECHNICAL FIELD

The invention is directed to a further advancement in the field of electrical connector assemblies. More specifically, this application relates to a snap-fit electrical connector assembly having a construction for facilitating the connection of the connector assembly and associated cable, wire conductor and the like to an electrical box.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box. Such known electrical connectors are either of a type that are secured to an electric box by a threaded lock nut or by means of a circular snap fit retaining ring of the type disclosed in U.S. Pat. Nos. 6,860,758; 6,444,907; 5,189,258; 5,266,050; and 5,171,164, for example.

So called "snap fit" connectors have been in use for some time, including connectors disclosed in Applicant's U.S. Pat. Nos. 7,064,272; 7,075,007; 7,205,489 and 7,214,890. Such connectors have typically been coupled to the junction box by forcibly inserting one end of the connector into the knock-out hole of a junction box. Such connectors include a circular retaining ring which is deformed during insertion of the connector body into a knock-hole. In the past, a generally linear motion has been used to insert the connector end into the junction box. Using such a straight motion, the connector end is pushed into the knock out hole so as to deform a retaining ring as it passes through the knock-out hole.

SUMMARY OF THE INVENTION

The present invention provides a connector assembly including a connector body with a locking cam defined on an external surface of the connector body. The locking cam cooperates with a perimeter of a knock-out hole into which the connector is to be inserted. During insertion of the connector body the locking cam engages the knock-out hole and deforms a retainer ring so as to permit further insertion. Once the connector body is fully seated, the locking cam cooperates with a locking tang on the retainer ring to hold the connector assembly together.

The present invention is also directed to a method of using a connector assembly having a locking cam defined on an external surface of the connector body, wherein the method includes tilting the connector assembly prior to insertion in a knock-out hole of a junction box, inserting the tilted connector assembly into the knock-out hole so that the locking cam engages a side wall of the junction box, then tilting the connector assembly in the opposite direction so as to further insert the connector body into the junction body. As the connector body is rotated, the retainer ring is initially deformed by contact with the junction box wall and then released after the retainer ring is within the junction box.

An object of the present invention is to provide an electrical connector with a retainer ring whereby the connector body is secured to an outlet box through simple insertion into an outlet box.

Yet another object of the present invention is to provide an electrical connector with a locking cam for cooperating with an edge of a knock-out hole of an outlet box during installation. The locking cam interaction generates a force tending to deform a retainer ring, allowing the connector to be fully inserted into the knock-out hole.

Yet another object of the present invention is to provide a method of using an electrical connector having a retainer ring and locking cam, the method including tilting the connector body in one direction so as to permit engagement between the locking cam and the junction box sidewall, and then tilting the connector body in the opposite direction so as to compress the retainer ring as it passes through a knock-out hole.

The foregoing has outlined rather broadly the features and technical advantage of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
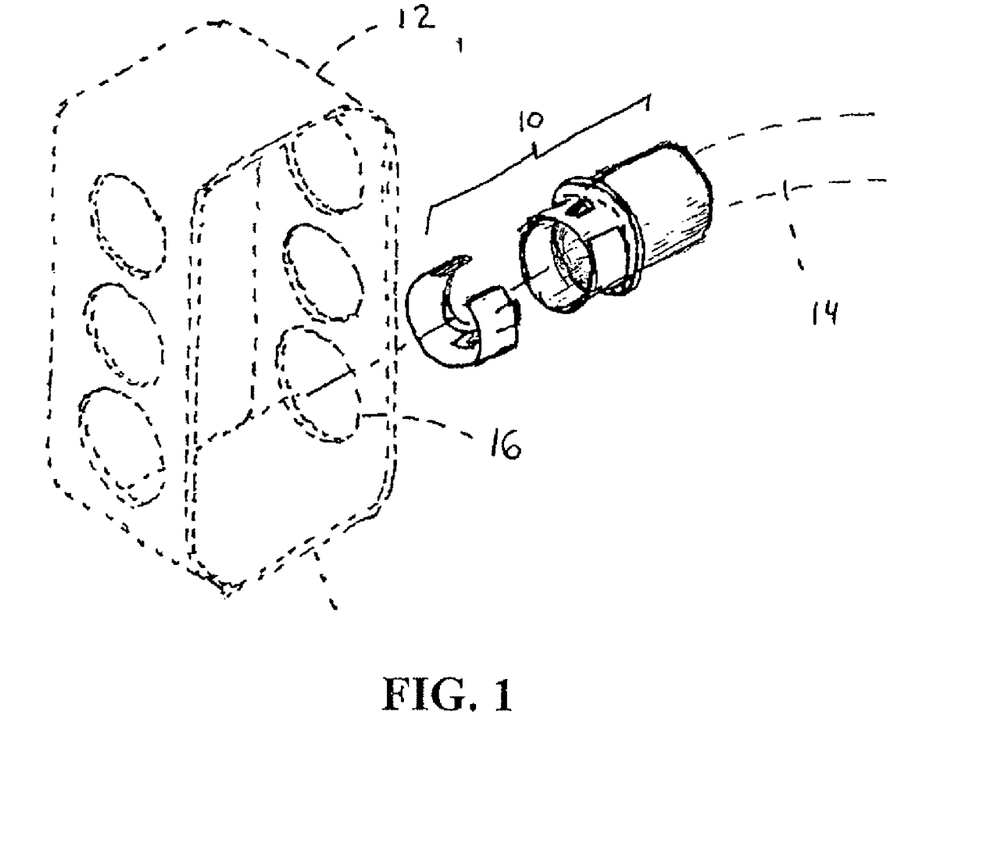
FIG. 1 is a perspective view of an electrical connector assembly in accordance with the present invention, depicted as being attached to an electrical junction box.

Referring to the drawings, FIG. 1 is a perspective view of the first embodiment of an electrical connector assembly 10 in accordance with the present invention. FIG. 1 depicts connector assembly 10 in a partially disassembled state relative to a junction box 12 and electric wire 14. As described hereinafter, connector assembly 10 is used to couple electrical wire 14 at knock-out hole 16 of junction box 12.

Figure 2:
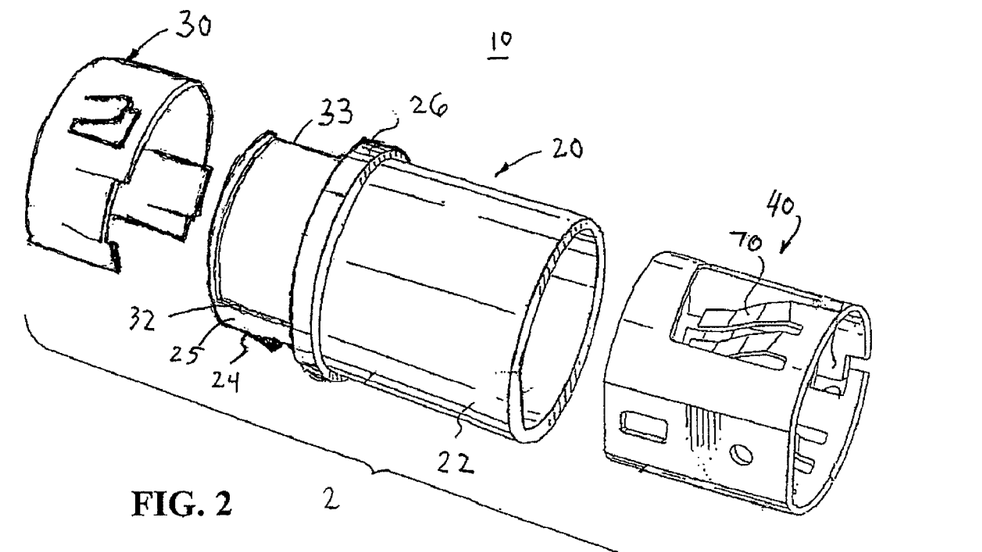
FIG. 2 is a perspective view of the electrical connector assembly of FIG. 1.
Figure 3:
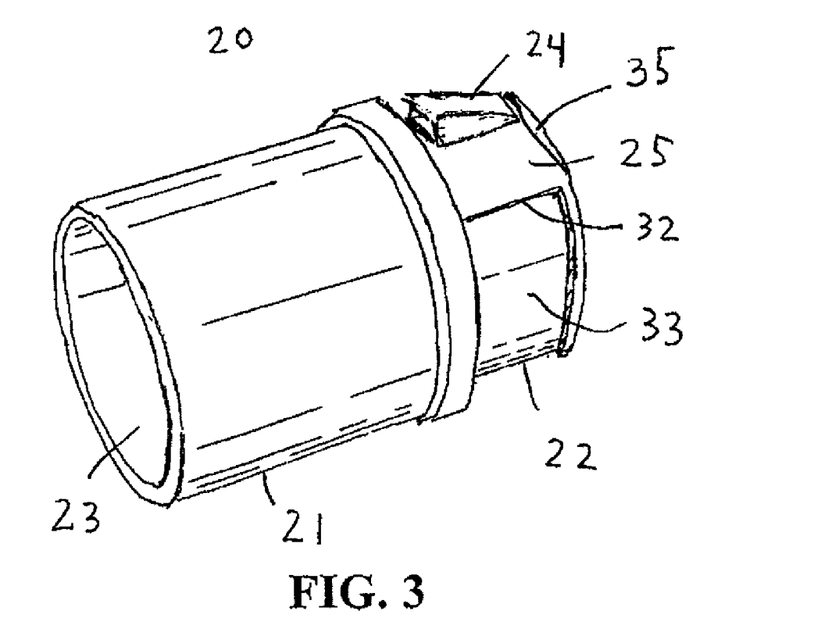
FIG. 3 is a perspective view of a body portion of the electrical connector assembly of FIG. 1.

Referring now to FIG. 2, connector assembly 10 includes connector body 20, retaining ring 30, and internal wire retainer 40. Connector body 20 is preferably formed of metal casting, e.g. zinc or other suitable metallic alloy. As shown in FIG. 3, connector body 20 is formed with an inlet end portion 21 and an outlet end portion 22 and a bore 23 extending therethrough. Outlet end portion 22 defines a substantially cylindrical form and includes a wedge-shaped locking cam 24 adapted to engage a knock-out hole perimeter during insertion of the connector body 20 into the knock-out hole. Locking cam 24 extends away from an outer surface of a retainer ring centering structure 25 of outlet end portion 22. As described in more detail hereinafter, locking cam 24 functions to deform the retaining ring 30 to ease insertion of the connector body 20 into the knock-out hole 16 and also functions as a component of a positive locking mechanism by which the connector body 20 is secured to junction box 12.

Intermediate the connector body 20, in the illustrated embodiment between the inlet end portion 21 and outlet end portion 22, there is provided radially outwardly extending flange 26 which functions as a stop to limit the degree to which connector body 20 may be inserted through the knock-out hole 16 of junction box 12. In the illustrated embodiment, stop flange 26 is unbroken, while in alternative embodiments stop flange 26 may comprise disjointed or separated elements encircling connector body 20 and together functioning to limit the degree to which connector body 20 may be inserted into an junction box 12.

Figure 4:
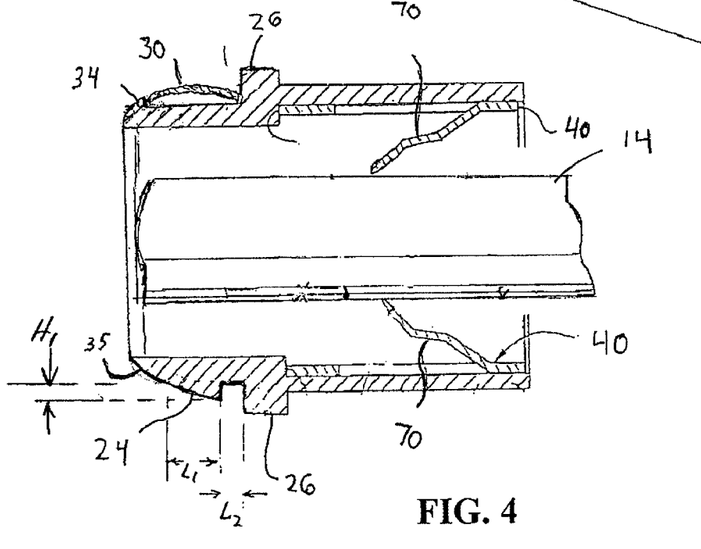
FIG. 4 is a cross sectional view of the electrical connector assembly of FIG. 1.

Referring to FIGS. 2 and 4, retaining ring 30 encircles at least a portion of outlet end portion 22 and is centered generally opposite locking cam 24. Retaining ring 30 is substantially cylindrical in form and adapted in size to be received on the outlet end portion 22. Retaining ring 30 is prevented from substantial rotation around outlet end portion 22 by ring centering structure 25 as ends of retaining ring 30 engage walls 32 of the ring centering structure 25. In the illustrated embodiment, retaining ring 30 is received within a channel-shaped depression 33 within outlet end portion 22 of the connector body 20. Depression 33 is semicircular and in a preferred embodiment covers approximately 250 degrees of the circumference of outlet end portion 22 with the ring centering structure 25 extending around the remaining approximately 110 degrees. As shown in FIG. 4, depression 33 extends from a front lip 34 of outlet end portion 22 to flange 26. Front lip 34, while shown in the drawings as an unbroken structure, can assume a variety of alternative forms, including but not limited to a plurality of broken segments. Locking cam 24 is defined by a length, L1 and a height, H1. A distance, L2, between a rear face of the wedge and the flange 26 approximates the wall thickness of junction box 12.

As shown in FIG. 3 a portion of outlet end portion 22, designated 35 results from a slight rounding or relief of the ring centering structure 25 near locking cam 25. This rounded structure provides for easier insertion of the locking cam 25 into the knock-out hole 16 during a preferred installation process as described with reference to FIGS. 7-10.

Figure 5:
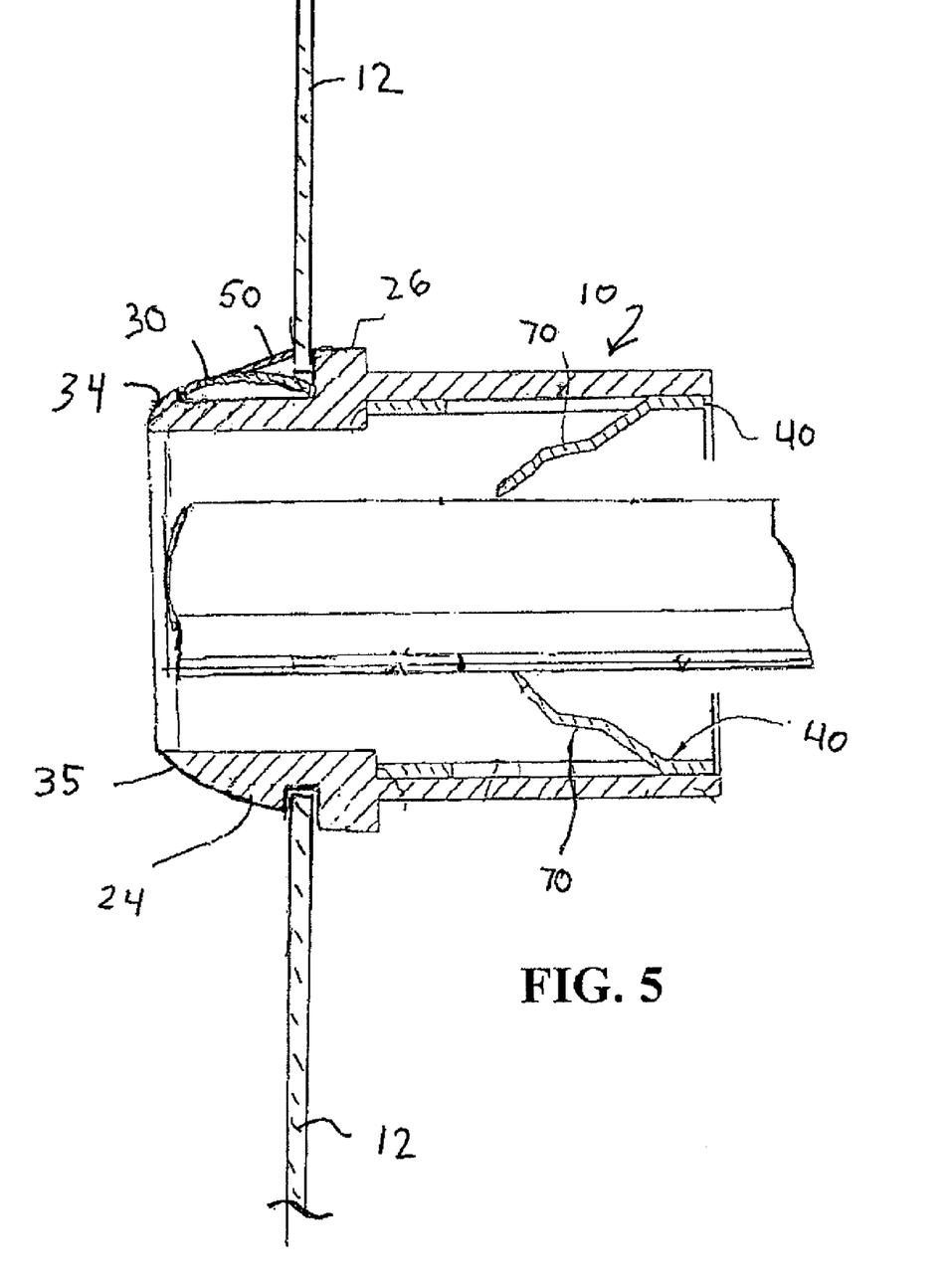
FIG. 5 is a cross sectional view of the electrical connector assembly of FIG. 1 as attached to a electrical junction box.

FIG. 5 illustrates the connector assembly 10 fully inserted into knock-out hole 16. Once the connector assembly 10 is fully inserted into the knock-out hole 16, the locking cam 24 and locking tang 50 of retaining ring 30 together function to secure the connector assembly against withdrawal. As described in more detail hereinafter, locking cam 24 initially engages a perimeter of knock-out hole 16 causing at least a portion of retaining ring 30 to deform as the connector assembly 10 is inserted into the knock-out hole 16.

Wire retainer 40 is received within a bore of connector body 20 and may be in the form of a ring, cylinder or sleeve. Wire retainer 40 functions as a unidirectional retainer means arranged to permit a wire conductor to be readily inserted and secured thereinto, and which will resist applied force imparted to the wire conductor in the opposite direction to prohibit any unintentional separation of the wire conductor from the connector body 20. Wire conductor, as used herein, means any wire, cable, helical wound metal covering or sheath (BX) wire, plastic sheath wire conductor and the like. Additional aspects of the wire retainer 40 are disclosed in Applicant's U.S. Pat. Nos. 7,064,272; 7,075,007; 7,205,489 and 7,214,890, each patent being incorporated herein for all purposes. As described hereinafter with reference to FIGS. 10-13, embodiments of a connector assembly 10 may utilize alternative wire retaining means.

Figure 6:
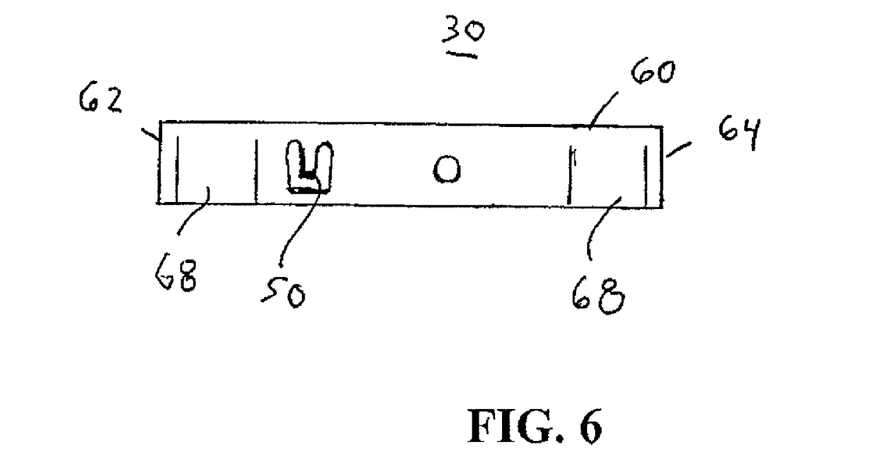
FIG. 6 is a top plan view of a blank used to form a retainer ring portion of the electrical connector assembly of FIG. 1.

Referring to FIG. 6, retaining ring 30 is integrally formed from a blank 60 of spring steel material. Retaining ring 30 extends between a pair of ends 62 and 64. Upon assembly, retaining ring 30 is prevented from rotation by contact between ends 62 and 64 and ring centering structure 25. Retaining ring 30 is blanked or formed to define the locking tang 50 and to either side thereof an electrical grounding tang 68. As shown, the locking tang 50 is slightly shorter than the adjacent grounding tangs 68. The arrangement is such that the free end of the locking tang 50 is formed so as to engage the inside surface of the junction box 12 to secure the connector assembly 10 to the junction box 12 and prohibit any unintentional withdrawal of the connector assembly 10 from the junction box 12. In comparison, the free ends of the grounding tangs 68 are biased into engagement with the internal periphery of the knock-out hole 16. The locking tang 50 is outwardly and cantileverly bent or displaced relative to the surface of the ring at a slightly greater outwardly angle or slope than the adjacent grounding tangs 68.

With the retainer ring 30 properly secured to the outlet end 22 of the connector body 20, the connector assembly 10 can be readily secured to an junction box 12 by simply aligning the assembly 10 with a knock-out hole 16, as best seen in FIG. 1, and inserting the leading or outlet end portion 22 into the knock-out hole 16 until the flange 26 engages the outer side of the Junction box 12. In doing so, the tangs 50, 68 will depress inwardly to permit insertion or the assembly 10. When the assembly is fully seated in the knock-out hole 16, the locking tang 50 will normally spring outwardly to secure the assembly 10 to the junction box 12, as noted in FIG. 5. As shown, when the assembly is fully seated, a rear portion of the locking cam 24 also secures the connector body 20 to the junction box 12. Grounding tangs 68 are normally biased in engagement with the internal periphery of the knock-out hole 16 to ensure a positive electrical ground with the junction box 12.

In the assembled position, the outer retainer ring 30 is secured to the connector body in a manner to prohibit any unintentional separation. The locking tang 50 is shaped and formed so that tang 50 secures the assembly 10 to an junction box 12 while the grounding tangs 68 ensure a positive electrical ground of the assembly 10 with the associated junction box 12.

The internal retainer 40 is preferably formed from an elongated blank of spring steel. The connector body 20 of FIG. 2 may be formed with an internal complementary flat surface along a portion of the inner circumference thereof. The arrangement is such that the retainer 40, when inserted into connector body 20, is oriented so that the flattened surface of the retainer 40 complements the internal flattened surface of the connector body 20. The orientation is such that the opposed spring finger tangs 70 are oppositely disposed to firmly grip the wire conductors, e.g. an armored conductor or other covered conductor.

The outer circumference of the inner retainer ring 40 is proportioned so that it can be press fitted or frictionally fitted into the connector body 20 by a force sufficient to firmly secure the inner retainer 40 within the inlet end so as to prohibit any separation of the retainer 40 from the inlet end of the connector body. The complementary flattened surfaces of the internal sleeve and connector body insures proper orientation of the retainer 40 within the inlet end of the connector body. Additional aspects of the inner retainer ring 40 are disclosed in Applicant's U.S. Pat. Nos. 7,064,272; 7,075,007; 7,205,489 and 7,214,890.

A method of using the connector assembly 10 of the present invention is now presented with reference to FIGS. 7-10. FIGS. 7-10 represent a sequence of motions of connector assembly 10 as it is connected to the side wall 71 of knock-out hole 16 of junction box 12.

Figure 7:
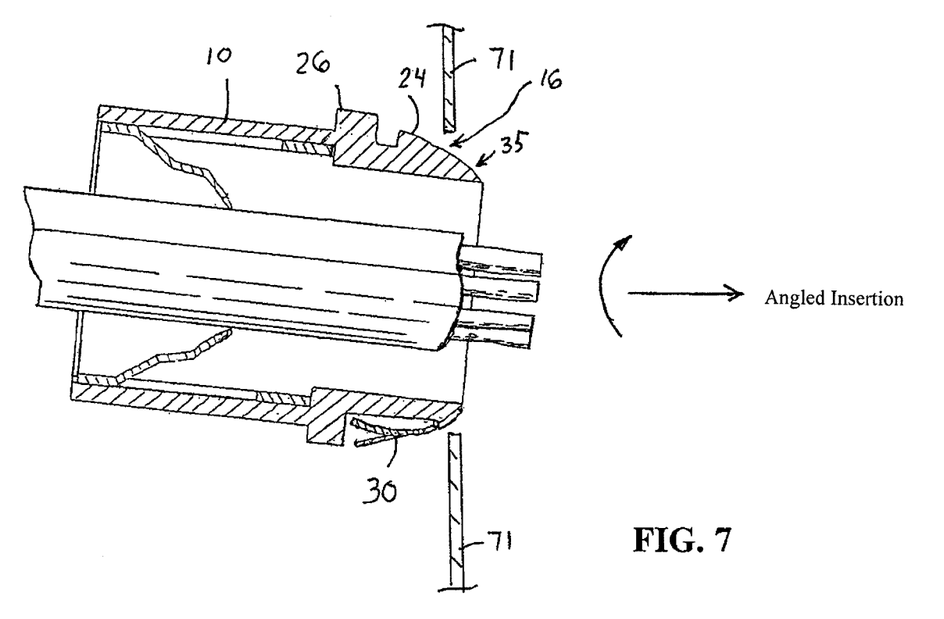
FIGS. 7-10 depict method of using the electrical connector assembly of FIG. 1.
Figure 8:
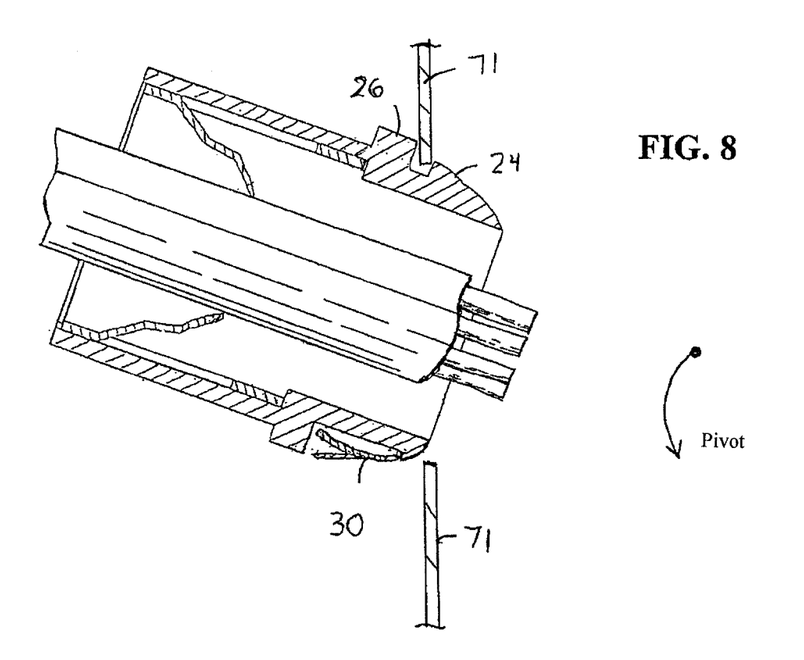

FIG. 7 depicts the connector assembly 10 as brought near knock-out hole 16. FIG. 8 depicts the connector assembly 10 of FIG. 7 as having been linearly displace and tilted in one direction (in this example, a clockwise rotation) so as to pass the locking cam 24 through knock-out hole 16. The connector body 20 is initially upwardly tilted in a manner allowing the locking cam 24 to be initially inserted into the knock-out hole with minimal or relatively no deformation of the retainer ring 30. A pivot point (or region) is generally defined between at lock cam 24/stop flange 26/side wall 71 engagement. As described below, the connector body 20 is rotated about the pivot during a retaining ring 30 insertion sequence.

Figure 9:
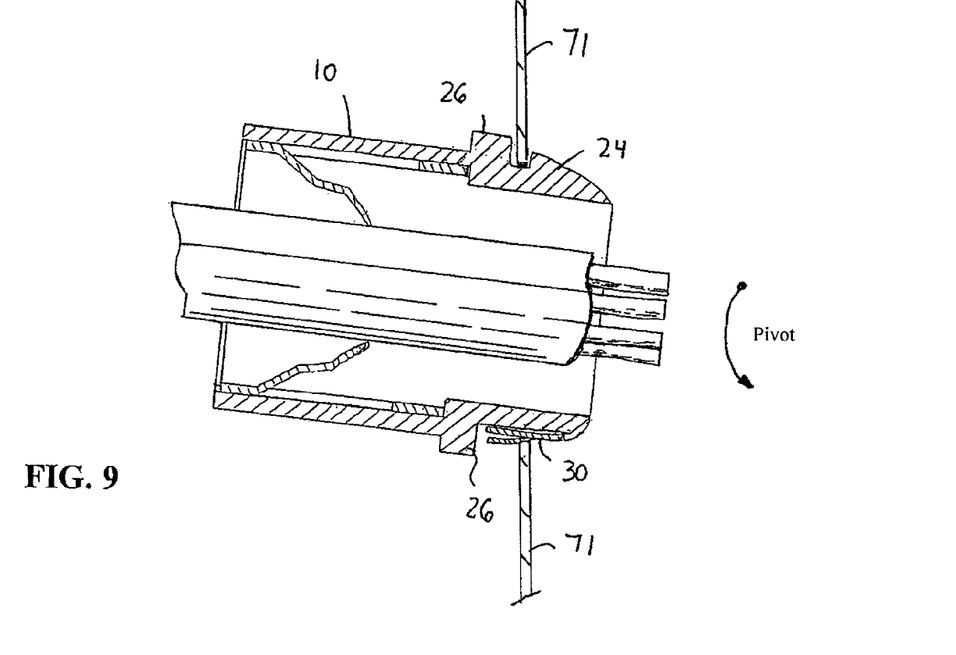
Figure 10:
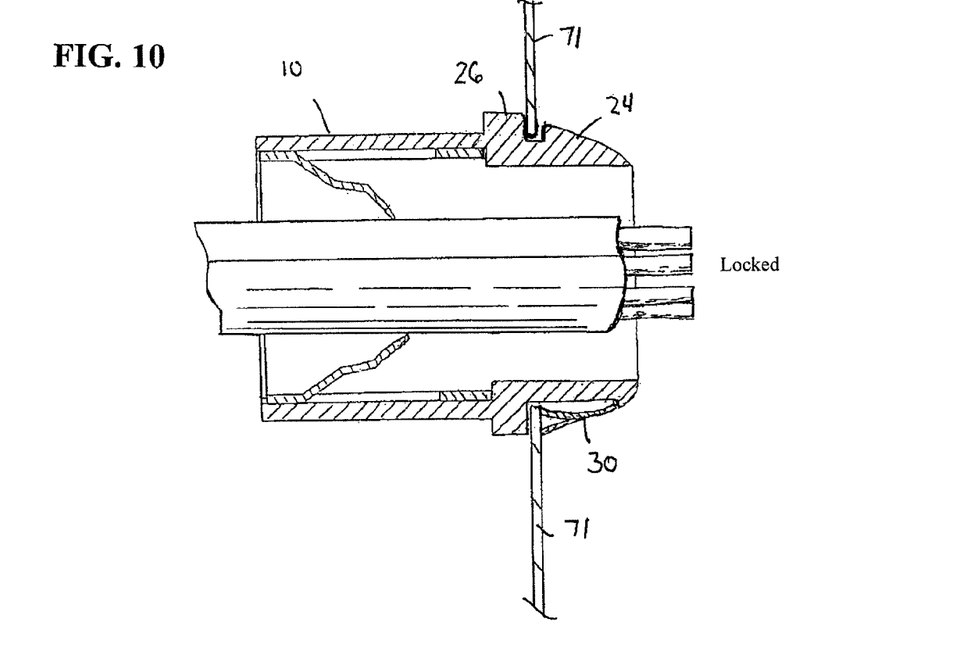

FIG. 9 depicts the connector assembly 10 of FIG. 8 as having been rotated about the pivot in a direction generally opposite the first direction (in this example, downwardly or in a counter clockwise rotation) so as to forcibly insert the retaining ring 30 into the knock-out hole 16. FIG. 9 depicts the retaining ring 30 in a deformed state as it passes through the knock-out hole 16. As would be appreciated by one of ordinary skill in the art, locking cam 24 functions to retain the upper portion of the connector body 20 within the knock-out hole 16 as the connector assembly 10 is downwardly tilted. The connector body 20 is further rotated until the stop flange 26 engages the junction box 12 as depicted in FIG. 10.

The present invention thus provides a unique method of coupling a connector assembly 10 to a junction box 12 via locking cam 24 and a tilting process whereby the retaining ring is deformed through mechanical advantage provided by the locking cam 24. In some examples, this mechanical advantage (provided by the locking cam 24 and tilting action) allows the connector body 20 to be coupled to the junction box 12 with substantially less insertion force as compared to linearly inserting the connector body 20 into the junction box 12.

Figure 11:
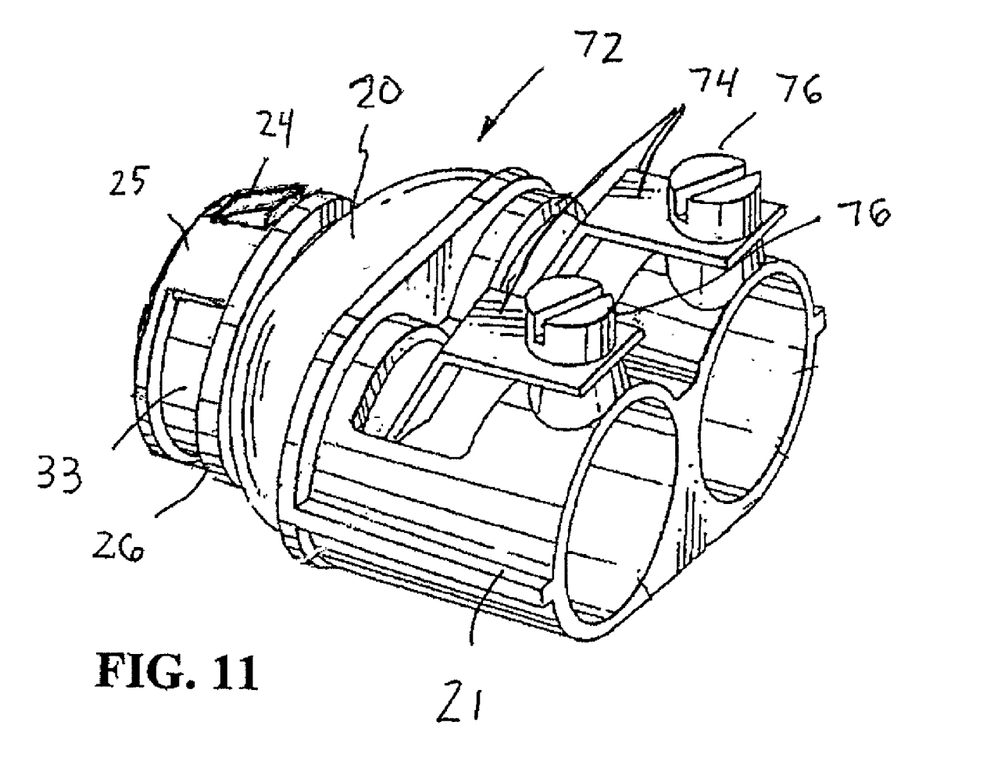
FIGS. 11-13 are illustrations of alternative embodiments of the present invention, showing different means of securing wires to the connector body.

It will be understood that the wire conductor 14 may be secured to the connector assembly 10 either before or after the assembly 10 has been secured to the junction box 12. In the illustrated embodiment, the conductor wire 14 is simply inserted into the inlet end portion 21 and secured in position by a suitable securing means. In the illustrated embodiment of FIG. 2, the securing means is illustrated as plurality of spring finger tangs 70. However, it will be understood that a variety of securing means, other than spring finger tangs 70, may be used. For example, FIG. 11 illustrates a duplex connector 72 embodiment of the present invention having wire retaining device 74 being attached via threaded fasteners 76 at one end and extending through an aperture on inlet end portion 21 on the other end. The other end of spring retaining means 70 engages the wire conductor upon its insertion into inlet end portion 21.

Figure 12:
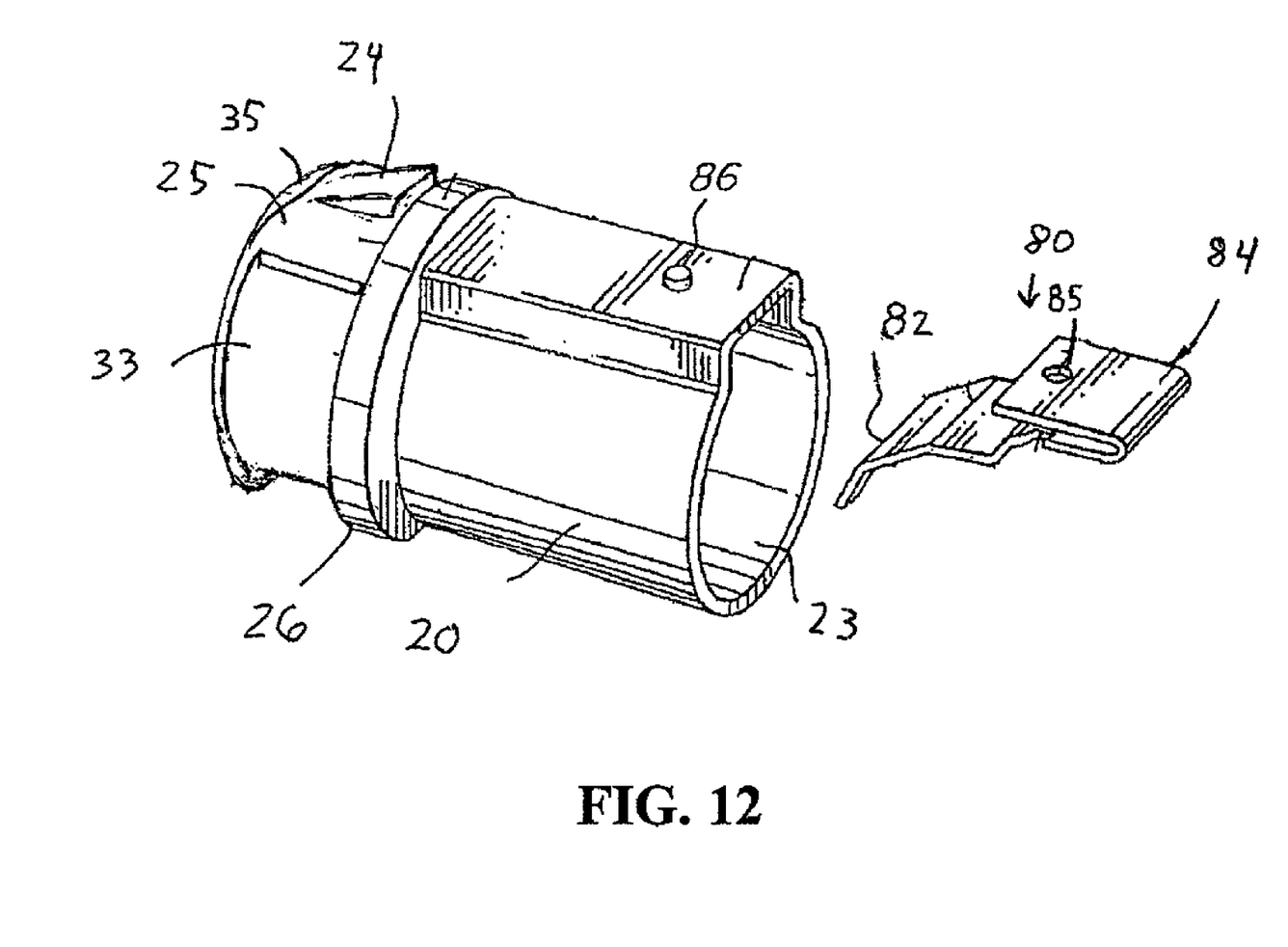

FIG. 12 illustrates another embodiment of wire retainer device 80 including a bent spring metal component having a portion 82 retained within bore 23 and another portion 84 defining a hole 85 which engages pin 86 upon assembly.

Figure 13:
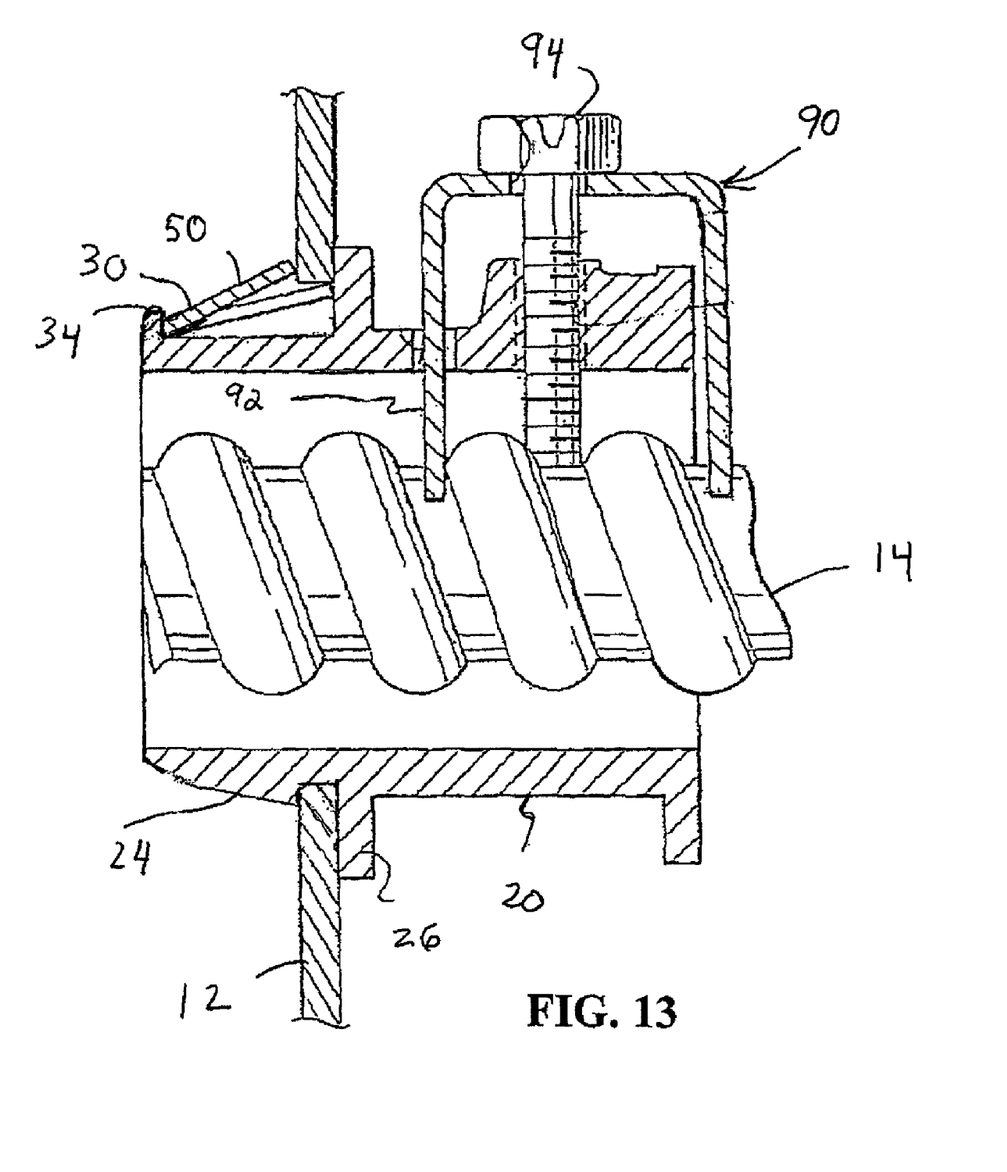

FIG. 13 illustrates yet another embodiment of a wire retainer device 90 including a unshaped element having one end 92 extending through an aperture of connector body 20. A threaded fastener 94 is used to secure the wire retainer device 90 to the connector body 20

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An electrical connector assembly for securing an electrical conductor to an electrical box comprising:
   a connector body having an inlet end portion, and an outlet end portion, and a stop flange;
   a locking cam defined on an external surface of said outlet end portion;
   a generally cylindrical, split retainer ring secured upon said outlet end portion with at least a portion generally opposite the locking cam, said split retainer ring having a pair of ends;
   a closed-ended channel at the outlet end portion for receiving the split retainer ring with each end of the split retainer ring being adjacent an end of the channel; and
   a retainer ring centering structure on said external surface of the outlet end portion between the ends of the channel, said retainer ring centering structure engaging the pair of ends of the retainer ring so as to limit substantial rotation of the retainer ring about the outlet end portion, and wherein the locking cam is located upon the retainer ring centering structure.

2. The assembly of claim 1 wherein the locking cam defines a wedge.

3. The assembly of claim 1 wherein the locking cam terminates a distance away from said stop flange.

4. The assembly of claim 1 wherein the channel extends approximately 250 degrees around the outlet end portion.

5. The assembly of claim 1 wherein the retainer ring centering structure cooperates with a lip on the outlet end portion so as to retain the retainer ring on the outlet end portion.

6. The assembly of claim 5 wherein the lip forms a portion of the channel into which the retainer ring is received.

7. A method of using the connector assembly of claim 1 comprising:
   tilting the connector body in a first direction, said tilting allowing the locking cam to be passed though a knock-out hole of the electrical box;
   locking a wall of the junction box between the locking cam and the stop flange;

tilting the connector body in a direction opposite said first diction, said tilting causing the retaining ring to be drawn into the knock-out hole; and locking the connector body to the electrical box by engaging an inner wall of the junction box with at least the locking cam and an extending portion of the retaining ring.

8. An electrical connector assembly for securing an electrical conductor to an electrical box comprising:
   a connector body having an inlet end portion, and an outlet end portion, and a stop flange;
   a locking cam defined on an external surface of said outlet end portion, said locking cam extending from near a front end of the connector body toward said stop flange, with said locking cam terminating prior to the stop flange;
   a generally cylindrical, split retainer ring having a pair of ends and being secured upon said outlet end portion with at least a portion generally opposite the locking cam;
   a closed-ended channel at the outlet end portion for receiving the split retainer ring with each end of the split retainer ring being adjacent an end of the channel; and
   a retainer ring centering structure on said external surface of the outlet end portion, said retainer ring centering structure engaging the ends the retainer ring so as to prevent substantial rotation of the retainer ring about the outlet end portion, and wherein the locking cam is located upon the retainer ring centering structure.

9. The assembly of claim 8 wherein the locking cam defines a wedge having an inclined planar face.

10. The assembly of claim 8 wherein the channel width is approximately equal to a width of the retainer ring.

11. The assembly of claim 8 wherein the retainer ring centering structure cooperates with a lip on the outlet end portion so as to retain the retainer ring on the outlet end portion.

12. The assembly of claim 11 wherein the lip forms a portion of the channel structure into which the retainer ring is received.

13. A method of using the connector assembly of claim 8 comprising:
   rotating the connector body in a first direction, said rotating allowing the locking cam to be passed though a knock-out hole of the electrical box with substantially no deformation of the retaining ring;
   locking a wall of the junction box between the locking cam and the stop flange;
   rotating the connector body in an opposite direction, said rotating causing the retaining ring to be drawn into the knock-out hole; and
   locking the connector body to the electrical box by engaging an inner wall of the junction box with at least the locking cam and an extending portion of the retaining ring.

14. An electrical connector assembly for securing an electrical conductor to an electrical box comprising:
   a connector body having an inlet end portion, and an outlet end portion, and a stop flange;
   a locking cam defined on an external surface of said outlet end portion, said locking cam extending from near a front end of the connector body toward said stop flange, with said locking cam terminating prior to the stop flange;
   a closed-ended channel at the outlet end portion;
   a split retainer ring secured within a channel on said inlet end portion; and
   a retainer ring centering structure located between ends of the channel and engaging at least one end of the retainer ring so as to prevent substantial rotation of the retainer ring about the outlet end portion, and wherein the locking cam is located upon the retainer ring centering structure.

15. The assembly of claim 14 wherein the channel has a depth approximately equal to a thickness of the retainer ring.

16. The assembly of claim 14 further comprising a locking tang on the retainer ring, with said locking tang and locking cam cooperating to secure the connector body to the electrical box.

17. A method of using the connector assembly of claim 14 comprising:
   providing the connector body in a first orientation whereby the stop flange is angled relative to a wall of the electrical box, said first orientation allowing the locking cam to be passed though a knock-out hole of the electrical box with substantially no deformation of the retaining ring;
   locking a wall of the junction box between the locking cam and the stop flange;
   rotating the connector body toward a second orientation, said rotating causing the retaining ring to be drawn into the knock-out hole; and
   continuing said rotating until the stop flange fully engages the wall of the electrical box.

18. A method using the connector assembly of claim 14 comprising:
   angling the connector body relative to the electrical box and inserting the locking cam though a knock-out hole of the electrical box, with a pivot defined between the locking cam, stop flange and a wall portion of the electrical box;
   rotating the connector body about the pivot, said rotating causing the retaining ring to be deformed and drawn into the knock-out hole; and
   continuing said rotating until the stop flange fully engages the electrical box.

19. A method of securing an electrical conductor to an electrical box using a connector assembly comprising:
   providing a connector assembly with connector body having a locking cam defined on an external surface of an outlet end portion, said locking cam extending from near a front end of the connector body toward a stop flange, with said locking cam terminating prior to the stop flange, and a split retainer ring secured within a channel upon said outlet end portion with at least a portion generally opposite the locking cam, and a retainer ring centering structure on said external surface of the outlet end portion between ends of the channel, said retainer ring centering structure engaging at least one end of the retainer ring so as to prevent substantial rotation of the retainer ring about the outlet end portion, and the locking cam is located upon the retainer ring centering structure;
   inserting said outlet end portion into a knock-out hole of the electrical box until a perimeter edge of the knock-out hole engages the locking cam;
   further inserting the outlet end portion into the knock-out hole whereby an inclined surface of the locking cam causes the retainer ring to deform;
   yet further inserting the outlet end portion into the knock-out hole wherein the inclined surface of the locking cam is released from contact with the knock-out hole perimeter; and
   locking the connector body into the knock-out hole with a rear portion of the locking cam, said rear portion being spaced from the stop flange by a distance approximating a wall thickness of the electrical box.

20. The method of claim 19 wherein said locking includes releasing a locking tang on the retainer ring from contact with the perimeter of the knock-out hole, said locking tang then engaging an inner wall surface of the electrical box.

21. The method of claim 19 wherein said inserting includes inserting at least a portion of the retainer ring into the knock-out hole prior to engagement between the locking cam and the knock-out hole perimeter.

* * * * *